Patented June 6, 1950

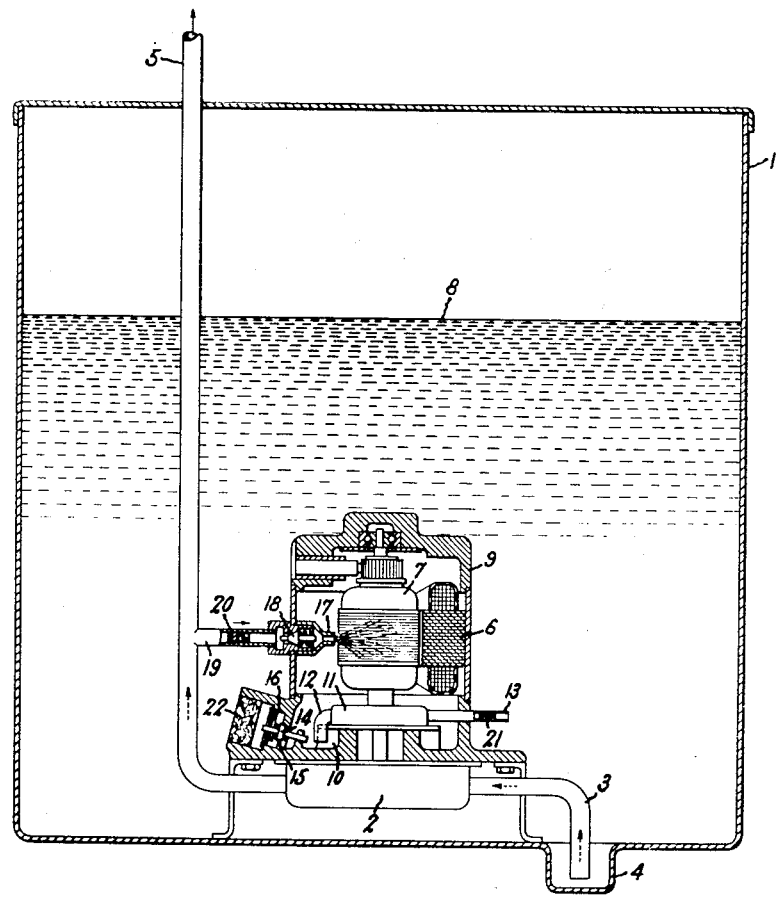

2,510,632

UNITED STATES PATENT OFFICE 2,510,632

MACHINE COOLING SYSTEM

Lawrence F. Hemphill, Fort Wayne, Ind., assignor to General Electric Company, a corporation of New York Application November 27, 1945, Serial No. 631,167

10 Claims. (Cl. 171—252)

My invention relates to particularly motorized pumping units in which the motor which drives the pump is adapted to be cooled by the fluid which is being pumped and is particularly useful where this fluid is a volatile liquid.

An object of my invention is to provide an improved motorized pumping unit.

Another object of my invention is to provide an improved machine cooling system.

A further object of my invention is to provide an improved dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, the figure is a side elevational view, partly in section, showing an embodiment of my invention in which an electric motor is arranged to drive a pump adapted to be submerged in a liquid within a container.

Referring to the drawing, I have shown my invention in connection with a motorized pumping unit which may be of the submersible type and which is adapted to pump a volatile liquid, such as gasoline, out of a tank or container 1 by any suitable pump 2 which is connected to an intake pipe 3 which extends into a well 4 formed in the lower portion of the container 1 and which is also connected to an exhaust or supply pipe 5 which extends out of the container 1.

This pump 2 is adapted to be driven by a dynamoelectric machine, such as a motor, having a stationary member 6 and a rotatable member 7 arranged to react electrodynamically with the stationary member 6 and which is mechanically connected to drive the pump 2. Any conventional suitable control means may be provided for energizing the electrical circuit of the motor for controlling the operation of the pumping unit. This motor is adapted to be immersed in the liquid 8 to be pumped, which may be a highly volatile liquid, such as gasoline, and is provided with an enclosing housing 9 for normally excluding liquid therefrom. This housing 9 is formed with a sump 10 in the lower portion thereof for collecting liquid which may condense or otherwise enter the housing 9, and a scavenging pump 11 is arranged in the housing 9 and is mechanically connected to be driven by the rotatable member 7 of the motor for pumping liquid from the sump back into the container 1. This scavenging pump is formed with an intake pipe 12 which extends down into the sump 10 and is provided with an exhaust connection 13 which extends into the container 1 for discharging any liquid which may be pumped by the scavenging pump back into the container 1. In some instances, it may be found that such a scavenging pump is not required, as the heat generated by the motor may be adequate for the purposes of evaporating any liquid from within the housing 9 and raising the pressure of this liquid to such an extent that it may escape from the housing 9 through a pressure relief valve 14 which is adapted to engage a valve seat 15 formed in the sump 10 to permit the escape of volatilized liquid from the housing into the container 1 above a predetermined pressure in the housing. In addition the position of the relief valve inlet in the sump provides for the exhaust of condensate therethrough when the pressure within the machine causes the valve to open. A biasing spring 16 is adapted to bias the valve 14 to closed position in contact with the valve seat 15 such that the valve 14 is opened only when the pressure within the housing 9 exceeds a predetermined value sufficient to permit the escape of gas through the valve without permitting the ingress of liquid back through the valve into the housing.

Under normal operating conditions, such an immersed pumping unit will remain at a safe operating temperature by the dissipation of heat from the motor through the housing 9 into the liquid 8. However, under certain overload conditions, as when it may be required to pump the liquid 8 at a higher pressure, the motor may tend to become overheated. In order to remove this excess heat during overload conditions, I provide an arrangement which includes a spray nozzle 17 connected to the exhaust side of the pump 2 through a pressure valve 18 and a pipe 19 for supplying some of the fluid into the housing and spraying it onto the dynamoelectric machine for cooling the machine when the pressure of the liquid within the exhaust pipe 5 exceeds a predetermined value. Thus under normal operating conditions, liquid which is pumped through the pipe 5 will not be sprayed into the housing 9 over the dynamoelectric machine, but during overload conditions, when the pressure in the exhaust supply pipes 5 exceeds a predetermined value, the valve 18 will be biased to its open position and some of the liquid which is pumped will be sprayed over the dynamoelectric machine. This spray will cool the machine by the thermal capacity of the liquid itself, by the latent heat of vaporization of the liquid, or also by the expansion of the gas from the reduction in pressure as it passes through the nozzle. This volatilized liquid will increase the pressure within the motor housing 9 and will be returned to the container 1 through the pressure relief valve 14 as explained above. Should some of the liquid condense within the housing 9, it will be collected in the sump 10 and be withdrawn from the housing by the pump 11 and returned to the container 1. In all constructions of this type, it will be necessary that the insulation of the motor and its contacting elements be made of suitable material which will not be affected by the gasoline or other liquid which is adapted to be sprayed over the motor for cooling purposes. The explosion resistance of the equipment is increased by the provision of explosion proof labyrinths 20, 21 and 22, respectively, on the inlet to the spray valve 18 and the exhausts of the scavenging pump 11 and the relief valve 14. These labyrinths may be made of any suitable material such as porous metals, wire gauze, or crinkled metal. With this simple cooling arrangement, it is possible to operate the pumping unit for a considerable period of time under an overload without appreciable damage thereto. In some installations, it may be found advantageous to operate the spray cooling system at all times when the equipment is in operation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A pumping unit adapted to be arranged within a container for liquids and including a motor, means including a pump mechanically connected to be driven by said motor for pumping liquid out of said container, said motor having an enclosing housing for excluding liquid therefrom and being adapted to be so located in said container that upon accumulation of a substantial depth of liquid in said container said housing will be immersed therein, means including a spray nozzle for supplying some of the pumped liquid into said housing onto said motor for cooling said motor, and pressure relief means for removing volatilized liquid from within said motor housing into said container above a predetermined pressure in said housing without permitting ingress of liquid from said container to said housing through said pressure relief means.

2. A pumping unit adapted to be arranged within a container for highly volatile liquids and including a motor having a stationary member and a rotatable member, means including a pump mechanically connected to be driven by said rotatable member for pumping liquid out of said container, said motor having an enclosing housing for excluding liquid therefrom and being adapted to be so located in said container that upon accumulation of a substantial depth of liquid in said container said housing will be immersed therein, means including a spray nozzle and a pressure valve for supplying some of the pumped liquid into said housing onto said motor for cooling said motor when said liquid is pumped by said first-mentioned pump above a predetermined pressure, and pressure relief means for removing volatilized liquid from said motor housing into said container above a predetermined pressure in said housing without permitting ingress of liquid from said container to said housing.

3. A pumping unit adapted to be arranged within a container for highly volatile liquids and including a dynamoelectric machine having a stationary member and a rotatable member, means mechanically connected to be driven by said rotatable member for pumping liquid out of said container, said dynamoelectric machine having an enclosing housing for excluding liquid therefrom and being adapted to be so located in said container that upon accumulation of a substantial depth of liquid in said container said housing will be immersed therein, means for supplying some of the pumped liquid into said housing onto said dynamoelectric machine for cooling said dynamoelectric machine when said liquid is pumped above a predetermined pressure, and means including a pressure relief valve for removing volatilized liquid from said dynamoelectric machine housing into said container above a predetermined pressure in said housing without permitting ingress of liquid from said container through said relief valve to said housing.

4. A pumping unit adapted to be arranged within a container for highly volatile liquids and including a dynamoelectric machine having a stationary member and a rotatable member, means mechanically connected to be driven by said rotatable member for pumping liquid out of said container, said dynamoelectric machine having an enclosing housing for excluding liquid therefrom, means including a spray nozzle and a pressure valve for supplying some of the pumped liquid into said housing onto said dynamoelectric machine for cooling said dynamoelectric machine when said liquid is pumped above a predetermined pressure, and means including a pressure relief valve for permitting the escape of volatilized liquid from said dynamoelectric machine housing into said container above a predetermined pressure in said housing without permitting ingress of liquid from said container through said relief valve to said housing.

5. A pumping unit adapted to be arranged within a container for highly volatile liquids and including a motor having a stationary member and a rotatable member, means mechanically connected to be driven by said rotatable member for pumping liquid out of said container, said motor having an enclosing housing for excluding liquid therefrom, means including a scavenging pump in said housing mechanically connected to be driven by said rotatable member for pumping liquid from said housing into said container, means for supplying some of the pumped liquid from said first mentioned pumping means into said housing onto said motor for cooling said motor, and pressure relief means for removing volatilized liquid from said motor housing into said container above a predetermined pressure in said housing without permitting ingress of liquid from said container to said housing.

6. A pumping unit adapted to be arranged within a container for highly volatile liquids and including a dynamoelectric machine having a stationary member and a rotatable member, means including a pump mechanically connected to be driven by said rotatable member for pumping liquid out of said container, said dynamoelectric machine having an enclosing housing for excluding liquid therefrom formed with a sump in the lower portion thereof for collecting liquid and being adapted to be so located in said container that on accumulation of a substantial depth of liquid in said container said housing will be immersed therein, means including a spray nozzle and a pressure valve connecting said spray nozzle to the exhaust side of said first-mentioned pump for supplying above a predetermined pressure some of the liquid pumped by said first-mentioned pump into said housing onto said dynamoelectric machine for cooling said dynamoelectric machine, and means including a pressure relief valve for removing volatilized liquid from said dynamoelectric machine housing into said container above a predetermined pressure in said housing without permitting ingress of liquid from said container through said relief valve to said housing.

7. A dynamoelectric machine having a stationary member and a rotatable member adapted to be arranged within a container for highly volatile liquids, means including a pump mechanically connected to be driven by said rotatable member for pumping liquid out of said container, said dynamoelectric machine having an enclosing housing for excluding liquid therefrom formed with a sump in the lower portion thereof for collecting liquid and being adapted to be so located in said container that on accumulation of a substantial depth of liquid in said container said housing will be immersed therein, means including a scavenging pump in said housing mechanically connected to be driven by said rotatable member for pumping liquid from said sump into said container, means including a spray nozzle and a pressure valve connecting said spray nozzle to the exhaust side of said first-mentioned pump for supplying above a predetermined pressure some of the liquid pumped by said first-mentioned pump into said housing onto said dynamoelectric machine for cooling said dynamoelectric machine, and means including a pressure relief valve for removing volatilized liquid from said dynamoelectric machine housing into said container above a predetermined pressure in said housing without permitting ingress of liquid from said container through said relief valve to said housing.

8. A pumping unit adapted to be arranged within a container for liquids and including a motor, means including a pump mechanically connected to be driven by said motor for pumping liquid out of said container, said motor having an enclosing housing for excluding liquid therefrom and being adapted to be so located in said container that upon accumulation of a substantial depth of liquid in said container said housing will be immersed therein, means including a spray nozzle for supplying some of the pumped liquid into said housing onto said motor for cooling said motor, pressure relief means for removing volatilized liquid from within said motor housing above a predetermined pressure in said housing without permitting ingress of liquid from said container to said housing through said pressure relief means, and explosion preventing means positioned in the inlet to said spray nozzle and in the outlet from said pressure relief means.

9. A pumping unit adapted to be arranged within a container for liquids and including a motor, means including a pump mechanically connected to be driven by said motor for pumping liquid out of said container, said motor having an enclosing housing for excluding liquid therefrom and being adapted to be so located in said container that upon accumulation of a substantial depth of liquid in said container said housing will be immersed therein, means including a spray nozzle for supplying some of the pumped liquid into said housing onto said motor for cooling said motor, pressure relief means for removing volatilized liquid from within said motor housing above a predetermined pressure in said housing without permitting ingress of liquid from said container to said housing through said pressure relief means, and explosion preventing labyrinth means in the inlet to said spray nozzle and in the outlet from said pressure relief means.

10. A pumping unit adapted to be arranged within a container for highly volatile liquids and including a motor having a stationary member and a rotatable member, means mechanically connected to be driven by said rotatable member for pumping liquid out of said container, said motor having an enclosing housing for excluding liquid therefrom, means including a scavenging pump in said housing mechanically connected to be driven by said rotatable member for pumping liquid from said housing into said container, means for supplying some of the pumped liquid from said first-mentioned pumping means into said housing onto said motor for cooling said motor, pressure relief means for removing volatilized liquid from said motor housing into said container above a predetermined pressure in said housing without permitting ingress of liquid from said container to said housing, and explosion preventing labyrinth means positioned in the inlet to said liquid supplying means and the outlets of said scavenging pump and said pressure relief means.

LAWRENCE F. HEMPHILL.

REFERENCES CITED

The following references are of record in the file of this patent:

UNITED STATES PATENTS

| Number | Name | Date |
|---|---|---|
| 1,114,727 | Breeze | Oct. 27, 1914 |
| 1,377,325 | Durnford | May 10, 1921 |
| 1,657,550 | Saathoff | Jan. 31, 1928 |
| 1,779,797 | Baum | Oct. 28, 1930 |
| 1,960,389 | McFerran | May 29, 1934 |

FOREIGN PATENTS

| Number | Country | Date |
|---|---|---|
| 165,806 | Great Britain | July 11, 1921 |